United States Patent [19]

Moriya

[11] 4,245,723

[45] Jan. 20, 1981

[54] DISC BRAKE APPARATUS FOR A MOTOR VEHICLE

[75] Inventor: Michio Moriya, Itami, Japan

[73] Assignee: Sumitomo Electric Industries, Ltd., Osaka, Japan

[21] Appl. No.: 5,893

[22] Filed: Jan. 23, 1979

[30] Foreign Application Priority Data

Jan. 23, 1978 [JP] Japan ................................. 53-6991

[51] Int. Cl.³ .............................................. F16D 55/22
[52] U.S. Cl. ................................... 188/72.3; 188/73.5
[58] Field of Search .................... 188/72.3, 72.4, 72.5, 188/73.5, 205 A, 216; 192/70.28

[56] References Cited

U.S. PATENT DOCUMENTS

| 2,244,169 | 6/1941 | Miller | 192/70.28 |
| 3,294,205 | 12/1966 | Schans | 188/216 |
| 3,463,275 | 8/1969 | Soltis | 188/205 A |
| 3,977,499 | 8/1976 | Johannesen | 188/73.5 |
| 4,134,477 | 1/1979 | Asquith | 188/73.5 |

FOREIGN PATENT DOCUMENTS 7442439  7/1976  France ................................. 188/73.5

1425269  2/1976  United Kingdom ................. 188/73.5

*Primary Examiner*—Edward R. Kazenske
*Attorney, Agent, or Firm*—Pollock, Vande Sande & Priddy

[57] ABSTRACT

A disc brake apparatus comprises a brake housing disposed to straddle over a brake disc, and a pair of suspended brake pad assemblies which are disposed in the brake housing at both sides of the brake disc. The brake pad assemblies are each formed with a pair of lateral projections each of which is slidably received in a guide groove formed in a stationary member connected to a stationary portion of a motor vehicle so that the pad assemblies may be moved toward and away from the brake disc under the guidance of the guide groove. A spring member is provided in one of the guide grooves located on the leading side of the brake apparatus as viewed in the rotating direction of the brake disc for urging resiliently the pad assemblies away from the brake disc, pressing it upwardly and toward the other groove, thereby to assure a smooth movement of the brake pad assemblies and at the same time to prevent generation of undesirable noises.

6 Claims, 8 Drawing Figures

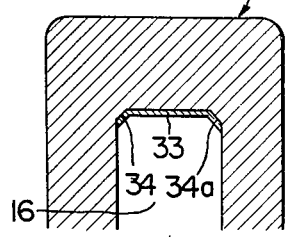
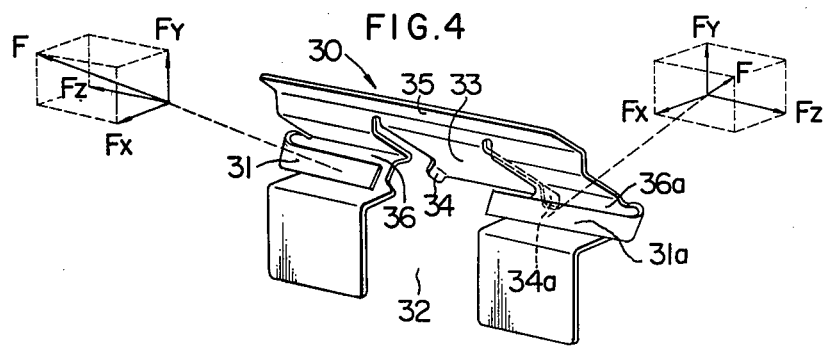
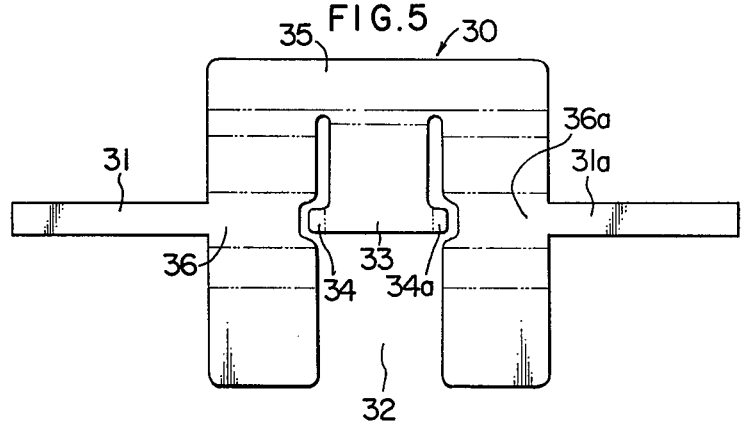

DISC BRAKE APPARATUS FOR A MOTOR VEHICLE

BACKGROUND OF THE INVENTION

1. Field of the Invention

The present invention relates to a disc brake apparatus for motor vehicle and in particular to a spring means incorporated in the disc brake apparatus to exert resilient forces to brake pad assemblies.

2. Description of the Prior Art

There has been hitherto known a floating caliper type disc brake apparatus in which a caliper having a pair of depending arms is positioned to straddle over and across a brake disc mounted on an axle of a motor vehicle and mounted on a stationary member to be movable relative and in parallel thereto. The stationary member in turn is fixedly secured to a stationary portion of the vehicle and has guide grooves formed in the inner wall at leading and trailing sides as viewed in the rotating direction of the disc brake. A pair of brake pad assemblies are disposed at both sides of the brake disc and suspended by the guide grooves so as to be moved toward and away from the brake disc. To this end, each of the brake pad assemblies is formed with a pair of lateral projections adapted to be slidably engaged in the guide grooves.

The disc brake apparatus of the above type has many disadvantages. In the first place, when the brake apparatus is used under unfavorable conditions, the braking plate of the pad assembly as well as the guide grooves tend to be incrusted with rust, as the result of which smooth movement of the brake pad assemblies is disturbed, partial adhesion of the brake pad to the brake disc will occur, the pad will undergo non-uniform abrasion and so forth. As an attempt to obviate such drawback, the width of guide groove is increased with a large clearance. However, this attempt will then involve other difficulties. Namely, various noises are produced. For example, rattling of the brake pad assemblies occurs during the normal running of the vehicle. Upon application of brake, a so-called clonk noise is produced due to the fact that the backing plate of the brake pad assembly strikes at the torque receiving portion of the stationary member. Further, since the brake pad assemblies are not positively retracted while brake is under a released condition, draggling of the pad by the brake disc as well as generation of the squeaking noise often occur.

SUMMARY OF THE INVENTION

An object of the invention is to provide an improved disc brake apparatus which is insusceptible to the disadvantages and drawbacks of the hitherto known brake apparatus described above.

According to the teaching of the invention, there is provided a disc brake apparatus for a motor vehicle comprising a brake housing, a pair of brake pad assemblies disposed in the brake housing at both sides of a brake disc so as to be movable toward and away from the brake disc, each of the brake pad assemblies having lateral projections, stationary guide means including guide grooves which receive slidably the lateral projections for suspending therefrom the brake pad assemblies and for guiding the movements of the brake pad assemblies, and spring means provided in at least one of the guide grooves for exerting at least a force for resiliently urging the brake pad assemblies to move away from the brake disc.

It is preferable that the spring means is provided of one of the guide grooves located at a leading side of the brake apparatus as viewed in a rotating direction of the brake disc, and the spring means exerts an additional force to press the brake pad assemblies in a rotating direction of the brake disc.

More preferably, the spring means exerts a further force for pressing the brake pad assemblies upwardly.

Above and other objects, features and advantages of the invention will become more apparent from the description of preferred embodiments shown by way of example only in the accompanying drawings.

BRIEF DESCRIPTION OF THE DRAWINGS

FIG. 3 is a sectional view taken along the line III—III in FIG. 2, FIG. 4 is a perspective view of a pressing spring member according to an embodiment of the invention, FIG. 5 is a developed view of the same.

DETAILED DESCRIPTION OF THE PREFERRED EMBODIMENTS

Figure 1:
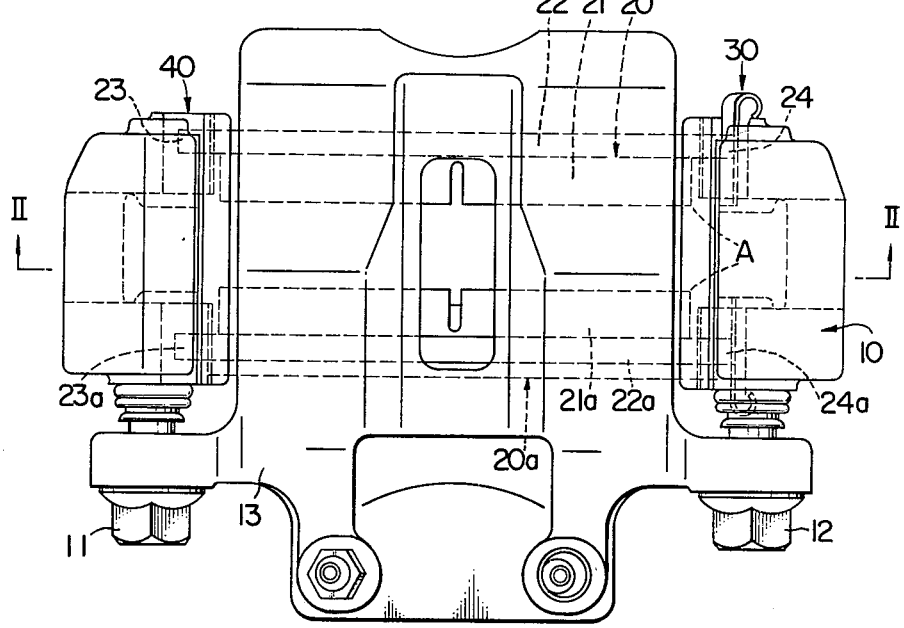
FIG. 1 is a top plan view of a disc brake apparatus according to an embodiment of the invention.
Figure 2:
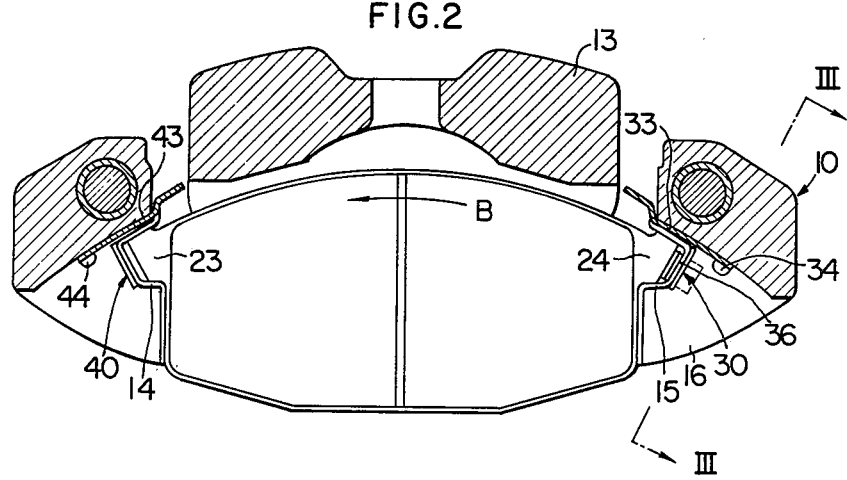
FIG. 2 is a sectional view of the same taken along the line II—II in FIG. 1.

Referring to FIGS. 1 and 2 showing a disc brake apparatus for motor vehicles to which the invention can be applied, reference numeral 10 denotes a stationary mounting block at which the brake apparatus is fixedly mounted on a stationary portion of the motor vehicle. Inserted slidably through the stationary member 10 at both sides thereof are a pair of guide pins 11 and 12 which support a caliper-like brake housing 13 in such manner that the caliper 13 may be reciprocately moved relative to the stationary mounting member 10. As is well known in the art, the caliper 13 is positioned so as to straddle over a brake disc (not shown) mounted on an axle rotatably with a wheel to be braked and has a pair of depending caliper arms. A pair of brake pad assemblies 20 and 20a are disposed within the caliper 13 in opposition to each other with the brake disc interposed therebetween.

The brake pad assembly 20 includes a brake lining 21 and a backing plate 22 which has lateral projections or ears 23 and 24 formed at lateral upper side portions thereof. On the other hand, guide grooves 14 and 15 of a substantially trapezoidal form complementary to that of the ears 23 and 24 are formed in the inner wall of the stationary member 10 to receive slidably and accidentally unremovably therein the projecting ears 23 and 24, respectively. In a similar manner, the other brake pad assembly 20a includes a brake lining 21a and a backing plate 22a having lateral projections 23a and 24a slidably engaged in the guide grooves 14 and 15, respectively.

A hydraulic piston cylinder actuator means (not shown) is provided in one of the caliper arms (lower arm as viewed in FIG. 1) to move the brake pad assembly 20a toward the brake disc when the brake is to be applied under guidance of the guide grooves 14 and 15. When the brake linining 21a is pressed against the brake disc, the caliper 13 is caused to be moved relative to the stationary member 10 under the reaction of the brake disc, as the result of which the other brake pad assembly 20 is brought into frictional contact with the brake disc under the pressing force exerted by the associated caliper arm as guided by the guide grooves 14 and 15.

For the convenience of description, it is assumed that the brake disc is rotated in the direction indicated by an arrow B as viewed in FIG. 2. According to the teaching of the invention, a spring member 30 formed of anti-corrosive metal materials such as a stainless spring steel sheet shown generally in FIG. 4 is provided for the guide groove 15 located on the upstream or leading side of the brake apparatus as viewed in the rotating direction of the brake disc, while a lining member 40 generally shown in FIG. 8 is provided for the guide groove 14 located on the downstream or trailing side in the same sense.

Figure 6:
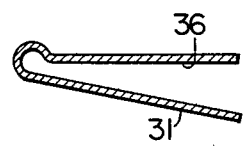
FIG. 6 is a fragmental view of FIG. 4 showing a longitudinal section of a pressing spring member.
Figure 7:
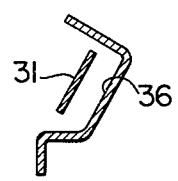
FIG. 7 shows a cross-section of the same.

Referring to FIG. 4, the spring member 30 is formed of anti-corrosive metal materials such as a punched stainless spring steel sheet as shown in a developed form in FIG. 5. As can be seen from FIG. 5, the developed spring member 30 is generally in a U-like form having laterally extending arms 31 and 31a and a central mounting flap 33 for securing the spring member 30 to the stationary portion 10. To this end, the mounting flap 33 is formed with latch projections 34 and 34a. Reference numeral 35 denotes a bridge portion. The blank sheet shown in FIG. 5 is transformed into a configuration shown in FIG. 4 by bending along the dotted broken lines. More specifically, the spring member 30 is a substantially trapezoidal and outwardly diverging channel-like member having a central notch 32. The portion from which the arms 31 and 31a extend laterally constitutes bottom portions 36 and 36a of the channel and is adapted to be positioned on the bottom of the guide groove 15. The stationary member 10 is of a substantially U-like cross-section defining an inner space 16 in which a peripheral portion of the brake disc is partially located, as is shown in FIG. 3. It will be noted that the guide grooves 14 and 15 are formed in the leg portions of the U-like stationary member 10. The mounting flap 33 with the latch projections 34 and 34a is snugly fitted onto the top inner wall of the stationary member 10 and held in place with the latch projections 34, 34a press-contacted with the corner portions of the top inner wall (FIG. 3). The arms 31 and 31a are folded toward the respective bottom portions 36 and 36a with a small angle relative to the latter so that the arms 31 and 31a may serve as leaf springs (Refer to FIGS. 4 and 6). Further, it should be noted that each of the spring arms 31 and 31a is inclined upwardly outwardly relative to a vertical line as viewed in the transverse cross-section (FIG. 7), so as to have its outer surface facing upwardly at a predetermined angle. It is preferred that the bottom portion 36 of the channel-like spring member 30 is also inclined relative to a vertical line so that the spring arm 31 extends substantially in parallel to the bottom portion 36 in the width or transversal direction. Of course, the guide groove 15 is imparted with such cross-section that the trapezoidal channel portion of the spring member 30 can be snugly received therein. In brief, it is necessary that the spring arms 31 and 31a are folded onto the bottom portions 36 and 36a, respectively, of the spring member 30 with a small angle relative to the latter in the longitudinal direction and that the spring arms 31 and 31a are inclined relative to the vertical line in the transverse direction so that the ears or lateral projections 24 and 24a of the brake pad assemblies which are destined to be received in the guide groove 15 and supported on the associated spring arms 31 and 31a are subjected to the spring forces which urge resiliently the corresponding brake pad assembly 20 or 20a in the direction to move them away from the brake disc and resiliently press the brake pad assemblies toward the other guide groove 14 or in the trailing direction, while at the same time the brake pad assemblies tend to be lifted or pressed upwardly, as will be hereinafter described in more detail.

Figure 8:
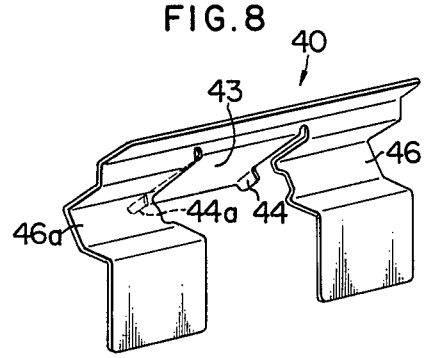
FIG. 8 is a perspective view of a lining member according to the invention.

On the other hand, the guide groove 14 formed in the stationary member 10 and located on the downstream or trailing side as viewed in the rotating direction of the brake disc (refer to the arrow B in FIG. 2) is provided with a lining member 40 which is generally shown in FIG. 8 and may be formed of the same sheet material as that of the spring member 30, being implemented in the substantially same configuration as the latter except that the spring arms 31 and 31a are absent. The lining member 40 is mounted on the stationary member 10 with the mounting flap 43 having latch projections 44 and 44a being engaged with and secured to the top inner wall of the U-like stationary member 10 while the guide bottoms 46 and 46a are fixedly received in the guide groove 14 formed in the leg portions of the member 10 in the same manner as described hereinbefore in conjunction with the spring member 30.

As will be appreciated from the foregoing description, the lateral projections or ears 23; 24 and 23a; 24a of the brake pad assemblies 20 and 20a are received in the guide grooves 14 and 15 so as to be supported and guided on the lining member 40 and the spring member 30, respectively. It is preferred that the ears 23; 24 and 23a; 24a are of the substantially same form as the sectional profiles of the associated guide grooves 14 and 15 and hence of the lining member 40 and the spring member 30 so that the brake pad assemblies 20 and 20a may be smoothly guided uppon application and removal of the braking force.

By virtue of the construction of the spring member 30 as described hereinbefore, each of the brake pad assemblies 20 and 20a is subjected to the force F which may be decomposed into three components of force $F_X$, $F_Y$ and $F_Z$, as illustrated in FIG. 4. The force components $F_X$ and $F_Z$ are ascribable to the fact that the spring arms 31 and 31a are folded toward the bottom portions 36 and 36a, respectively, with a predetermined angle, while the force component $F_Y$ is ascribable to the fact that the spring arms 31 and 31a are inclined transversely relative to a vertical line. Under the component force $F_X$, the brake pad assemblies 20 and 20a are constantly resiliently urged toward the lining member 40 or in the direction in which torque is transmitted to the stationary member 10 upon application of brake, whereby rattles of the brake pad assemblies 20 and 20a in the non-braked state as well as clonk noise upon application of brake are prevented from being generated. The component force $F_Y$ is effective to urge the brake pad assemblies 20 and 20a upwardly toward the top inner wall of the stationary member, whereby generation of rattle in the non-braked state can be suppressed. Finally, the component force $F_Z$ urges constantly the brake pad assemblies to be moved away from the brake disc, as the result of which rattling of the pad assemblies is suppressed, while at the same time generation of squeaking noise as well as draggling of the brake pad assemblies by the brake disc are satisfactorily suppressed in the non-braked state because the brake pad assemblies are prevented from contacted with the brake disc particularly at points A as shown in FIG. 1.

The lining member 40 formed of a stainless spring steel and disposed in the opposite guide groove 14 assures a smooth movements of the brake pad assemblies for a long use life.

The spring member 30 as well as the lining member 40 can be mounted on the stationary member 10 in a facilitated manner by vitue of the mounting flaps 33 and 43, respectively. Further, it will be self-explanatory that the blank material of a stainless steel for the spring member 30 and the lining member 40 are insusceptible to formation of rust and corrosion, thereby to assure a smooth movements of the brake pad assemblies during an elongated period without incurring adhesion of the pad assemblies to the guide grooves due to corrosion and rust. Further, the bridge portion of the spring member 30 as well as the corresponding bridge portion of the lining member 40 prevent foreign substances from entering inside toward the brake disc. In the foregoing, the invention has been described in conjunction with the preferred embodiments illustrated in the drawings. However, the invention is never restricted to these embodiments but many modifications and variations will readily occur to those skilled in the art without departing from the scope and spirit of the invention. For example, although the spring arms 31 and 31a have been assumed to be formed integrally with the spring member 30, it will be readily appreciated that separate leaf springs may be alternatively secured to the spring member 30 by welding or the like means. In such case, the spring member 30 becomes utterly identical with the lining member 40, whereby the fabrication procedures thereof can be much simplified, involving significant reduction in the manufacturing costs.

I claim:

1. In a brake apparatus for a motor vehicle of the type including a brake housing, a brake disc, a pair of brake pad assemblies disposed in said brake housing at both sides of said brake disc so as to be movable toward and away therefrom, each said brake pad assembly having lateral projections, and stationary guide means including guide grooves which receive slidably said lateral projections for suspending therefrom said brake pad assemblies, the improvement comprising spring means provided in at least one of said guide grooves located at a leading side of said brake apparatus as viewed in the rotating direction of said brake disc, for exerting forces for resiliently urging said brake pad assemblies to move away from said brake disc, for resiliently pressing said brake pad assemblies in the rotating direction of said brake disc, and for resiliently pressing said brake pad assemblies upwardly, said spring means comprising a substantially trapezoidal and outwardly diverging channel-like member which is snuggly fitted into said one guide groove of a corresponding sectional profile, said channel-like member having a pair of spring arms for exerting resilient forces to said respective brake pad assemblies, each said spring arm having an end connected to a laterally outer end of a bottom portion of said channel-like member and extending laterally inwardly along said bottom portion with a predetermined angle relative to the plane of said bottom portion, each said spring arm being inclined upwardly outwardly relative to a vertical line as viewed in the transverse cross-section.

2. A disc brake apparatus as set forth in claim 1, wherein said bottom portion of said channel-like member is inclined substantially parallel to said spring arms as viewed in the transverse cross-section.

3. A disc brake apparatus as set forth in claim 2, wherein said spring means is made of a resilient, anti-corrosive metal material to assure smooth movement of said brake pad assemblies without involving tendency of said lateral projections being adhered to said guide grooves.

4. A disc brake apparatus as set forth in claim 2, wherein another one of said guide grooves formed at a trailing side of said brake apparatus as viewed in the rotating direction of said brake disc is of a substantially trapezoidal and outwardly diverging channel-like cross-section and is fitted therein with a lining member of anti-corrosive metal material.

5. A disc brake apparatus as set forth in claim 1, wherein said spring means is made of a resilient, anti-corrosive metal material to assure smooth movement of said brake pad assemblies without involving tendency of said lateral projections being adhered to said guide grooves.

6. A disc brake apparatus as set forth in claim 1, wherein another one of said guide grooves formed at a trailing side of said brake apparatus as viewed in the rotating direction of said brake disc is of a substantially trapezoidal and outwardly diverging channel-like cross-section and is fitted therein with a lining member of anti-corrosive metal material.

* * * * *